United States Patent [19]

Kaptrosky

[11] 3,796,134
[45] Mar. 12, 1974

[54] HYDRAULIC BOOSTER BRAKE MECHANISM

[75] Inventor: Alfred R. Kaptrosky, Ovid, Mich.

[73] Assignee: Midland-Ross Corporation, Cleveland, Ohio

[22] Filed: Dec. 6, 1972

[21] Appl. No.: 312,614

[52] U.S. Cl................... 91/418, 91/391 R, 60/548, 60/494, 137/101
[51] Int. Cl. F15b 11/10, F15b 12/042, F15b 13/10
[58] Field of Search............ 60/445, 452, 450, 464, 60/548, 552, 494, 420; 137/101; 91/412, 418, 29, 449

[56] References Cited
UNITED STATES PATENTS
| | | | |
|---|---|---|---|
| 3,610,101 | 10/1971 | Meyers | 91/391 R |
| 3,677,007 | 7/1972 | Goscenski | 60/548 |
| 3,033,221 | 5/1962 | Strader | 137/101 |
| 3,623,321 | 11/1971 | Schwerin | 60/420 |

*Primary Examiner*—Edgar W. Geoghegan
*Assistant Examiner*—A. M. Zupcic
*Attorney, Agent, or Firm*—Irvin L. Groh

[57] ABSTRACT

A hydraulic booster brake mechanism for use with an open center power steering system of a motor vehicle in which a booster brake mechanism employs a mechanism permitting operation of the booster brake mechanism utilizing the pressures already made available due to operation of the power steering system. In the event the available pressure from the power steering system is not sufficient to accomplish the degree of braking desired, the control mechanism is actuated to increase and maintain the pressure produced by the power steering system at predetermined minimum pressure levels slightly above the pressure level necessary to accommodate the requirements of the booster brake mechanism.

10 Claims, 2 Drawing Figures

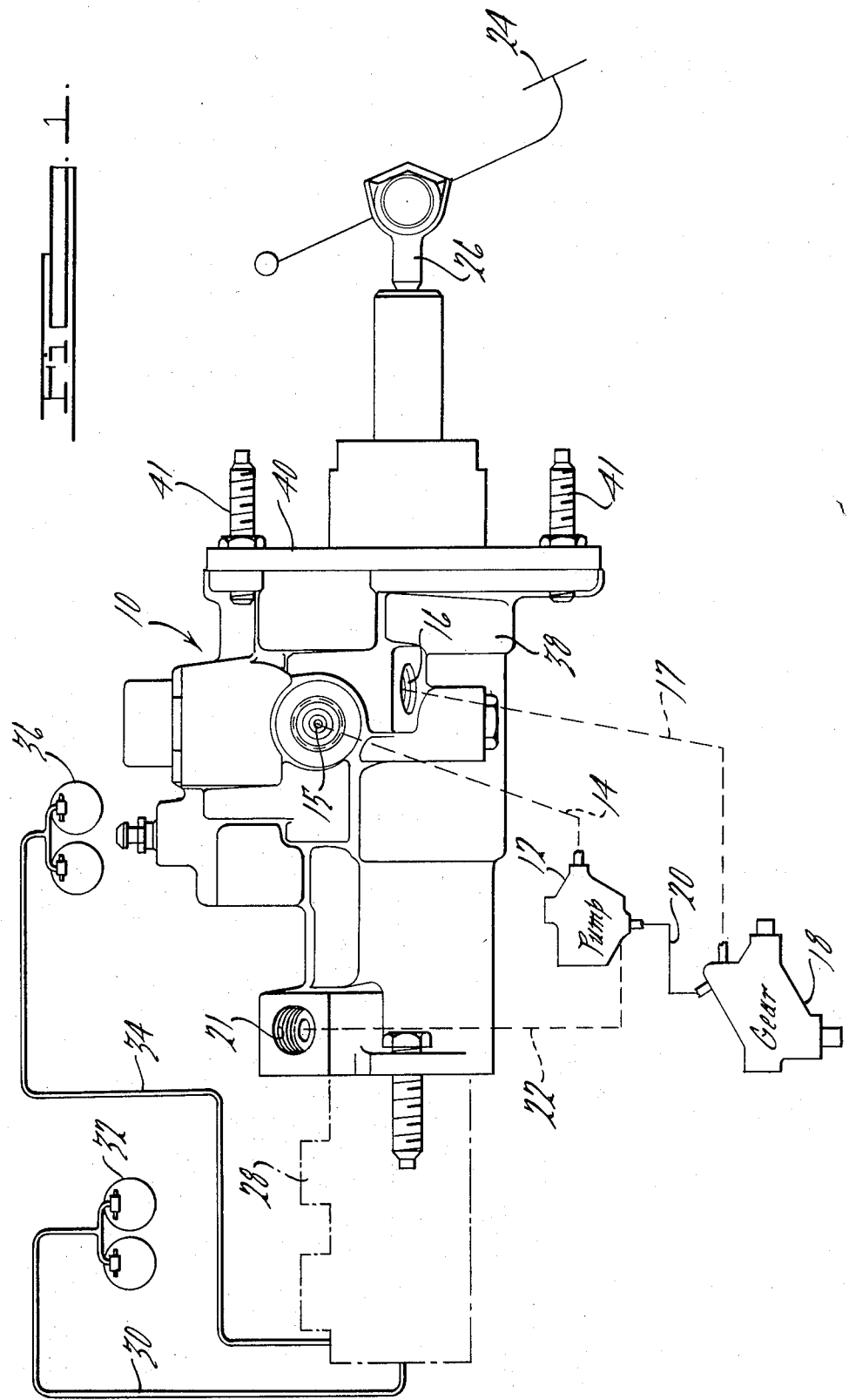

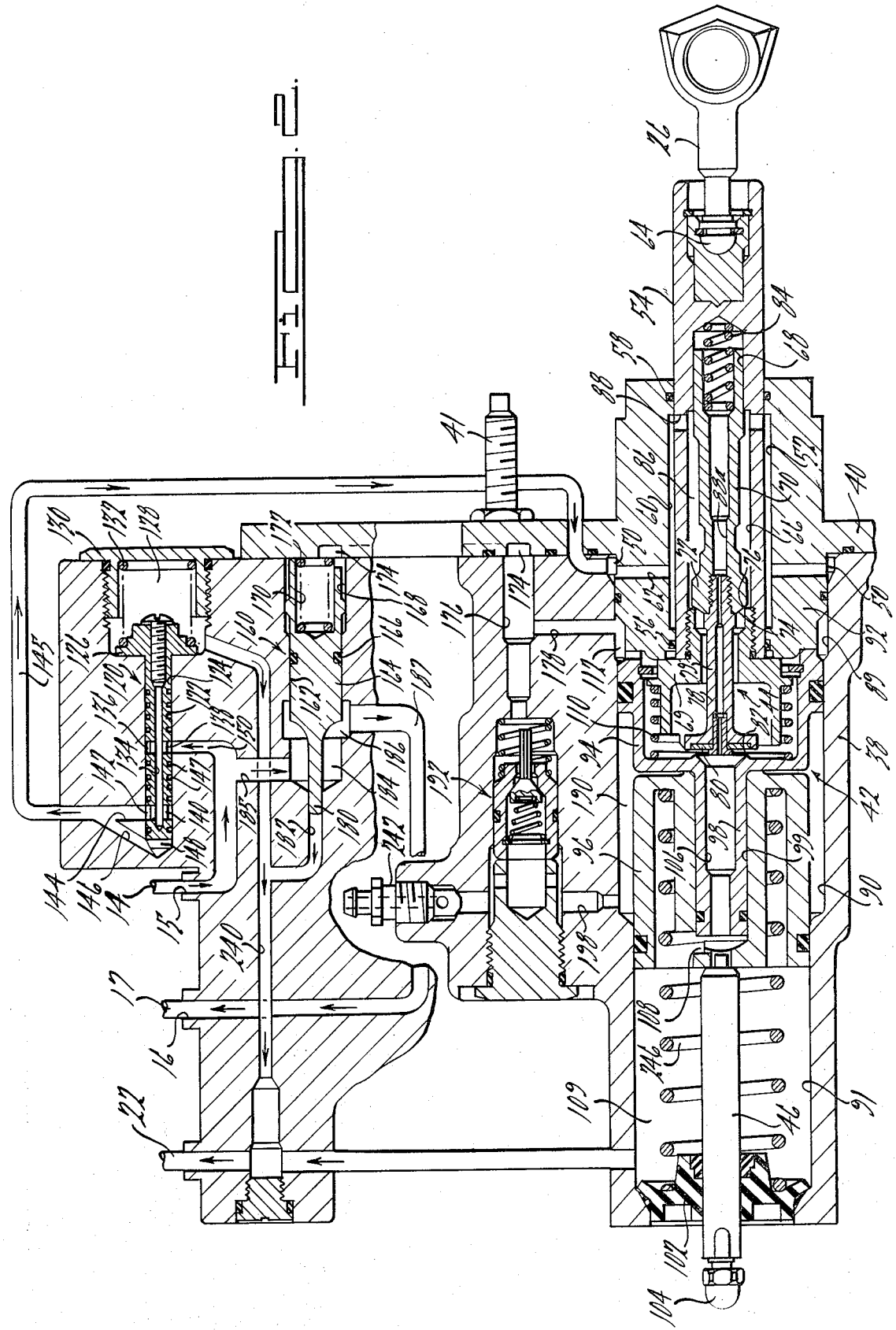

3,796,134

HYDRAULIC BOOSTER BRAKE MECHANISM

SUMMARY OF THE INVENTION

This invention relates to hydraulic booster brake mechanisms for use in the brake systems of motor vehicles and, more particularly, to such a booster mechanism utilizing the pressure of an open center power steering system.

A power booster brake mechanism employing the pressure of a power steering system as a source of pressure for the booster have not been received favorably by automotive manufacturers because of the large pressure loads imposed on the power steering system which often can reduce performance or cause premature wear of components of the power steering system. This has necessitated the use of separate hydraulic pumps to supply the booster brake mechanism or the use of accumulators to store pressure for use by the booster brake mechanism. Such approaches add substantially to the expense of a hydraulic booster brake system and, moreover, create installation problems because of demands for space, usually in the engine compartment, which in today's vehicles is limited.

The use of accumulators and booster brake mechanisms cause additional problems in that pressure to operate the booster brake mechanism must be stored at a relatively high level to accommodate the maximum demands at which the power brake mechanism may be operated. As a result, the booster brake mechanism itself is subject to the relatively high pressures even when substantially lower pressures would be sufficient to operate the booster. Moreover, the high pressure is imposed on various dynamic seals which increases the frictional forces which must be overcome during operation and modulation of the booster brake mechanism and seriously detracts from the operating characteristics.

It is an object of the invention to provide a booster brake mechanism which utilizes the pressure of an open center power steering system for its source of pressure and which utilizes the pressure made available until such time that higher pressures are needed at which time the booster mechanism imposes a small additional load on the power steering system to create the pressure required.

It is a further object of the invention to provide a booster brake mechanism which normally utilizes the pressure already made available by the power steering system and only places demands on the power steering system when additional pressure is required.

Still another object of the invention is to provide a booster brake mechanism in which the pressure of the power steering system is not affected until such time as additional pressure is required, at which time, the pressure of the power steering system is increased to a minimum predetermined level.

These and other objects of the invention will become apparent from the following description, the appended claims and the accompanying drawings disclosing a preferred embodiment of the invention.

DESCRIPTION OF THE DRAWINGS

FIG. 1 is a side elevation of the hydraulic booster brake mechanism embodying the present invention shown in its relationship to associated components of a vehicle braking system and a vehicle power steering system; and FIG. 2 is a longitudinal, sectional view of the hydraulic booster shown in FIG. 1 with portions of the housing distorted and broken away in the interest of clarity to show the various components of the hydraulic booster mechanism in their fluid flow relationship to each other.

DETAILED DESCRIPTION

Referring to the drawings and particularly to FIG. 1, a hydraulic booster brake mechanism 10 is incorporated in a power steering system of the open center type in which a power steering pump 12 continuously circulates hydraulic fluid through a line 14 to an inlet 15 in the hydraulic booster brake mechanism 10 and through the power brake mechanism 10 to an outlet 16 connected by a line 17 to a power steering gear 18 of a type used for power steering of a motor vehicle. The power steering pump 12 normally circulates fluid to the power steering gear 18 in a range of approximately 30 psi to 1,200 psi depending on whether or not a steering correction is being made by the operator. Hydraulic fluid is returned from the power steering gear 18 through a return line 20 to a fluid reservoir associated with the power steering pump 12. The return pressure of the hydraulic fluid is approximately five psi. The fluid circulated from the power steering pump to the power steering gear is utilized during operation of the power brake mechanism 10 and the fluid utilized is returned through an outlet port 21 to a conduit 22 and to the reservoir of the power steering pump 12.

The power brake mechanism 10 is actuated by a foot pedal 24 which moves an input member 26 to control operation of the power brake 10 to increase the pressure in a conventional dual master cylinder 28 to transmit hydraulic pressure through a brake line 30 to the front brakes 32 of the vehicle and through a brake line 34 to the rear brakes 36 of the vehicle.

The booster brake mechanism includes a housing made up of a forward housing section 38 to which the master cylinder 28 is attached and a rearward cover plate and housing section 40 which is provided with studs 41 by which the entire housing assembly and master cylinder 28 may be mounted in a conventional manner within the engine compartment of a vehicle.

Referring now to FIG. 2, the hydraulic brake booster 10 is shown in flow diagram form with the various components accurately illustrated but with the housing 38, 40 distorted and the various passages schematically illustrated to better understand the fluid flow within the brake booster mechanism 10.

Referring now to FIG. 2, the forward housing section 38 of the power brake unit 10 slidably receives a power piston assembly generally designated at 42. Hydraulic fluid which is delivered to the inlet 15 of the housing section 38 from the power steering pump 12 is under the control of a follow-up valve generally designated at 44. The follow-up valve 44 is actuated by movement of the input member 26 so that upon movement of the latter for application of the brakes, pressure within the housing 38, 40 at the right end of the piston assembly 42 is increased causing the piston assembly to move to the left and to apply a force to an output member 46 which in turn actuates the brake master cylinder for application of the brakes.

The housing sections 38 and 40 form therebetween an annular fluid supply chamber 50 which receives fluid from the power steering pump through the inlet 15 and at the same pressure as the pressure existing at the inlet 15 in a manner to be described in more detail later. The rearward housing section 40 has a longitudinally extending bore 52 which slidably receives a generally tubular control member 54. The bore 52 has reduced diameter portions at its opposite ends in which seals 56 and 58 are in position to engage the outer surface of the control member in a fluid tight but slidable relationship. The enlarged portion of the bore 52 between the seals 56 and 58 forms an annular cavity 60 around the exterior of the control member 54 which receives hydraulic fluid from the supply chamber 50 through radially extending passages 62.

The right end of the control member 54, as viewed in FIG. 2, is adapted to receive a spherical end portion 64 of the input member 26 so that movement of the brake pedal 24 is effective to move the control member 54. The opposite end of the control member 54 is formed with an elongated blind bore having a portion 66 and a smaller bore portion 68. The left end of the bore 66 is partially closed by a generally cup-shaped member 69 which is threaded into the end of the control member 54 in fluid tight relation thereto. A valve control rod assembly 70 is supported for sliding movement within the bore 66, 68. The right end of the valve rod assembly is slidably supported in the small bore portion 68 and an intermediate portion is provided with an enlarged, fluted head 72 which slidably engages the enlarged bore portion 66 but permits the passage of fluid. The enlarged head 72 is provided with a tapered face 74 which is adapted to engage an annular shoulder 76 formed at the right end of the cup-shaped head portion 69. The tapered face 74 and the annular shoulder 76 form the inlet valve of the power brake mechanism 10. A mushroom shaped valve member 78 has its stem portion 79 threaded into the head 72 and the left end is provided with a seal 80 which is adapted to engage an annular valve seat 82 in the piston assembly 42. The seal 80 and the annular valve seat 82 form the exhaust valve portion of the follow-up valve mechanism.

The valve rod assembly 70 is adapted to slide relative to the control member 54 and is continuously urged to the left by a spring 84 acting between the end of the small bore portion 68 and the valve rod assembly and normally functions to maintain the inlet valve 74, 76 in a closed position as shown in FIG. 2. The valve rod assembly 70 acts with the bore portion 66 to form an annular fluid cavity 86 which is in communication with the cavity 60 by means of radial passages 88. Hydraulic fluid supplied by the power steering pump 12 to the annular supply cavity 50 is made available at the inlet valve 74, 76 by way of a radial passage 62, the annular cavity 60 and the radial passages 88 to the cavity 86. A fluid passage 88a is formed the entire axial length of the valve rod assembly to insure that the cavity containing the spring 84 is exposed to fluid pressure.

The forward housing portion 38 is provided with a stepped bore having a large bore portion 89, an intermediate bore 90 and a small bore 91. The large bore 89 receives a cylindrical portion 92 of the rear housing section 40. Also received in the stepped bore is the piston assembly 42 made up of two pistons, namely, a large diameter, power piston 94 slidable in the intermediate bore 90 and a smaller diameter output piston 96 slidable in the small bore 91. The power piston 94 is generally cup-shaped and has a forward extending, hollow rod portion 98 which is slidably supported in a bore 99 of the output piston 96. The output piston 96 is connected to the end of the output rod 46 and the latter has its intermediate portion slidably supported in a seal and bearing member 102 in the end wall of the forward housing section 38. The end of the output rod 46 is provided with a spherical stud 104 threadable into the rod 46 which permits adjustment between the master cylinder piston (not shown) of the master cylinder 28 mounted on the end of the forward housing section 38 as seen in FIG. 1.

The rod portion 98 of the power piston 94 has an axial passage 106 by which the bores 89 and 91 at opposite ends of the piston assembly 42 are placed in communication with each other. The left end of the passage 108 communicates with the left end of the bore 99 in the output piston 96 and a radial opening 108 communicates the bore 99 with an exhaust chamber 109 formed in the housing bore 91. The right end of the passage 106 is open to the annular valve seat 82 formed within the cup-shaped power piston 94.

Movement of the control member 54 to the left from the position shown in FIG. 2, is against the resistance of a spring 110 having its opposite ends acting against the power piston 94 and the plug element 69, respectively. During such movement, the valve rod 70 moves as a unit with the control member 54 until the exhaust valve element 80 engages and closes the exhaust valve seat 82 after which additional movement of the valve rod 70 is interrupted and further movement of the control member 54 will cause the stationary valve rod 70 to compress the spring 84 and the tapered inlet valve 74 separates from the annular valve seat 76 to open the inlet valve assembly. Opening of the inlet valve makes hydraulic fluid under pressure in the cavity 86 available to a power chamber 112 formed to the right of the power piston 94. Upon the introduction of fluid under pressure to the power chamber 112, the piston assembly 42 is moved to the left to actuate the master cylinder 28 and apply the brakes.

The annular fluid supply chamber 50 formed between the rearward and forward housing sections 38 and 40 is in communication with the inlet port 15 from the power steering pump 12 through a pressure limiting valve assembly 120 which functions to limit the maximum pressure which can be made available for utilization by the booster brake mechanism 10. The valve assembly 120 includes a stem portion 122 which is slidably disposed in a bore 124 and a head portion 126 mounted on one end of the stem 122 and disposed in an enlarged cavity 128 formed in the housing section 38 and closed by a cup-shaped cap element 130. A spring 132 acts between the head 126 and the cup-shaped cap 130 to urge the stem 122 and head portion 126 to the left to the position in which it is shown in FIG. 2.

The stem portion 122 has an axial passage 134 which is closed at its opposite ends. An intermediate portion of the stem 122 has a reduced diameter portion which forms an annular cavity 136 between the stem 122 and the bore 124. The annular cavity 136 communicates by way of radial passages 138 with the axial passage 134. Another radial passage 140 is formed at the end of the axial passage 134 and communicates with a reduced diameter portion in the stem 122 which forms an annular cavity 142 that communicates by way of a bore 144 in the housing 38 and with the line indicated at 145 with the supply chamber 50. The bore 144 also communicates by way of a bore 146 with a chamber 148 formed at the left end of the stem 122 as viewed in FIG. 2.

Fluid supplied from the power steering pump 12 which enters the inlet 15 is transmitted through a passage 150 which communicates with the annular chamber 136 through the radial passage 138, the axial passage 134, the radial passage 140, the bore 144 and line 145 with a supply chamber 50.

Under normal operating conditions, pressure from the power steering pump 12 is free to enter the inlet 15 and to pass through the pressure regulating valve 120 to the annular chamber 50. However, if the pressure entering the inlet portion 15 from the power steering pump 12 should exceed some predetermined value considered to be excessive, the same pressure is communicated to the chamber 148 at the left end of the stem 122 and acts to urge the latter to the right against the biasing action of the spring 132 which is selected of a value which will deflect at the desired limiting pressure. Such movement causes the stem 122 to block off the bore 150 from the bore 144 so that the inlet 15 is isolated from the supply chamber 50. Thereafter, the pressure at inlet 15 can exceed the predetermined value without causing a pressure increase in the supply chamber 50. As the pressure of fluid in the chamber 50 is decreased below the selected level due to utilization of fluid for operation of the booster mechanism, the spring 132 will return the stem 122 to the left to open the bare 150 to the bore 144 and again permit pressure from the inlet 15 to be communicated to the annular supply chamber 50.

In the preferred embodiment of the invention, the value of the spring is selected so that it will be overcome by a pressure of 800 psi although other pressure levels may be selected which are adequate. It will be noted that the stem portion 122 at opposite sides of the annular cavities 142 and 136 is provided with a number of annular reduced portions 147. These annular portions become filled with fluid due to slight leakage around the stem and its bore and facilitate easy sliding movement of the stem 122 in its bore and obviate the need for seals which add frictional forces inhibiting free sliding movement. The lack of seals makes it possible for the pressure regulating valve to close the port 150 to the port 144 at a predetermined pressure and to reopen when the pressure in the chamber 50 drops below the predetermined pressure. The use of seals, on the other hand, could well require the valve to close at one pressure and to reopen at some lower pressure represented by the friction of the seals being used.

The maximum pressure which is made available to the annular supply chamber 50 for operation of the hydraulic booster brake mechanism is determined by the pressure regulating valve 120 but magnitude of the pressure up to the maximum pressure which is made available to the annular supply chamber 50 at any given time during operation of the power brake mechanism is under the control of a demand valve 160 which is disposed in a stepped bore 162 in the housing section 38. The demand valve assembly 160 includes a piston 164 slidably supported in the bore 162 and sealed relative thereto by an annular seal 166. One end of the piston 164 is disposed in an enlarged bore portion 168 and is itself provided with a blind bore 170 which contains a compression spring 172 having one end seated against the end of the blind bore 170 and its opposite end seated against the inner wall of the housing section 40. The cavity formed in the bore portion 168 to the right of the seal 166 communicates with a manifold passage 174 in the rear housing section 40 which, in turn, communicates with an axial passage 176 and a cross bore 178 with the power control chamber 112 disposed to the right of the piston assembly 42.

One end of the demand valve piston 164 has a stem portion 180 formed integrally with the piston 164 and supported for sliding movement in a reduced bore 182. As shown in FIG. 2, the stem portion 180 passes through a cavity 184 which communicates by way of a passage 185 with the inlet 15 from the power steering pump. Between the cavity 184 and the bore portion 162 is an enlarged chamber 186 which communicates by means of a passage 187 with the outlet 16 to the power steering gear. In the position shown in FIG. 2, power steering fluid circulated from the power steering pump 12 through the line 14 and the inlet 15 is free to pass through the passage 185, the cavity 184 around the stem 180, to the enlarged chamber 186, the passage 187 and through the outlet 16 to the power steering gear. The pressure of the circulating fluid between the power steering pump 12 and the associated power steering gear 18 is commonly to the order of 30 to 70 psi. As a consequence, the demand valve piston 164 is urged to the right by the pressure acting on an effective area which is the cross-sectional area of the bore 162 at the seal 166 less the cross-sectional area of the stem 180 in the bore 182. The force on the plunger urging it to the right is opposed by the force of the light spring 172 and the pressure in the chamber formed by the bore 168 acting to the left on an area defined by the cross-section of the bore 162 at the seal 166. When the power brake mechanism is not being operated, the pressure in the chamber 168 which is in communication with the power chamber 112, as previously described, is at a minimum, usually to the order of 5 psi or less. As a result, the larger force acting to the right on the piston 164 is sufficient to compress the spring 172 and to maintain the plunger 164 with its end against the inner wall of the rear housing section 40. In this position, the power steering fluid being circulated to the inlet 15 passes unobstructed to the power steering gear 18. In the event, however, that the pressure in the chamber 168 increases as a result of the operation of the power brake mechanism to apply the brakes, the valve plunger or piston 164 is urged to the left to act against the pressure of the incoming supply fluid from the power steering pump 12 so that the piston 164 obstructs the passage of fluid flow from the cavity 184 to the enlarged chamber 186. This creates a back pressure which requires the power steering pump 12 to increase the pressure being delivered to the inlet 15. This increase in pressure is delivered through the pressure regulating valve 120 and to the annular supply cavity 50 so that the increased pressure is available for utilization by the follow-up valve mechanism 44 for controlling the operation of the booster brake during actuation of the brakes.

Referring to FIG. 2, the piston assembly 42 of the power brake mechanism 10 includes the power piston 94 disposed in sealing engagement with the bore 90 and the relatively movable output piston 96 which is in sealing engagement with the smaller bore 91. The space in the bore 90 between the power piston 94 and the output piston 96 forms a stroke control cavity 190 which is used for the purpose of controlling the length of the stroke of the power brake mechanism. For present purposes of understanding the invention, it is necessary only to consider that the fluid in the chamber 190 is normally isolated from the rest of the system so that movement of the power piston 94 and output piston 96 as a unit to the left would tend to reduce the volume of the control cavity 190. However, to maintain a constant volume, movement of the power piston 94 to the left as viewed in FIG. 2 causes the output piston 96 to move a greater distance than the power piston 94. The fluid pressure in the cavity 190 is under the control of a pedal ratio control valve 192 which communicates by way of a radial passage 198 with the cavity 190 and with the power chamber 112 through axial passage 176 and radial passage 178. During most operations of the power brake mechanism, the valve 192 functions to isolate the fluid in the ratio control chamber 190 and operates to exhaust fluid therefrom to the control chamber 112 under conditions when fluid pressure is not available or when the maximum pressure available for use in braking has been utilized. The valve 192 also functions to open communication between the control chamber 112 and the cavity 190 so that fluid may be resupplied to the ratio chamber 190 after such fluid has been depleted.

To insure that the various cavities and passages are supplied with fluid and that failure of certain seals or the lack of such seals which causes leakage around some of the moving parts will not deplete the hydraulic steering circuit of its fluid, passages are provided to the low pressure return line, as best seen in FIG. 2. For example, cavity 128 of the pressure regulating valve 120 communicates with the return line 22 by means of a passage 240. In like manner, the bore 182 housing the stem 180 of the pressure demand valve 160 communicates with the passage 240 and therefor with the return line 22. Also, to insure that all cavities and passages are occupied by fluid of the power steering circuit, a bleed valve 242 of conventional type is located in the housing section 38 to permit loading of fluid into the hydraulic circuit upon installation of the booster brake mechanism 10 in a vehicle.

Operation of the power brake unit 10 is best understood by reference to FIG. 2 which shows the relationship of the various components to each other. Under normal operating conditions with the power brake mechanism 10 in an unapplied or brake released condition and with the power steering pump 12 circulating hydraulic pressure through the various lines without any steering correction being made, parts of the hydraulic power brake occupy the position shown in FIG. 2 and the entire system is filled with hydraulic fluid. The power steering pump 12 normally circulates hydraulic fluid at a pressure of approximately 30 to 50 psi or more and such pressure exists in the line 14 to the power brake mechanism and in the line 17 from the power brake mechanism to the power steering gear 18. The power steering fluid pressure in the lines 14 and 17 also is available through the pressure limiting valve 120 to the annular cavity 50 and, as a consequence, is made available at the inlet valve 74, 76 of the follow-up valve mechanism 44. The remainder of the power brake mechanism and its various passages and cavities is at return pressure, that is, a minimum pressure to the order of approximately 5 psi or less which is returned through the line 22 to the reservoir of the power steering pump 12.

When a brake application is made under a condition when no steering correction is being made, a force applied to the brake pedal 24 is transmitted through the input rod 26 to cause movement of the control member 54 to the left. Such movement compresses the spring 110 and the control member 54 and the valve rod 70 move as a unit toward the power piston 94 until the exhaust valve 80 engages the exhaust valve seat 82 to close the passage formed by the axial bore 106 communicating with the return chamber 109. Subsequent travel of the control member 54 to the left is made relative to the stationary control rod 70 causing the spring 84 at the right end of the valve rod 70 to be compressed and the tapered face 74 of the valve head to separate from the valve seat 76 thereby admitting the pressure from the chamber 86 in the control member 54 to the power chamber 112 formed at the right of the power piston 94. The increase in pressure in the power chamber 112 will cause the power piston assembly 42 to move to the left because of the lesser pressure in the cavity 109 to the left of the piston assembly 42.

As previously mentioned, the pressure of the circulating fluid from the power steering pump 12 to the inlet 15 and from the outlet 16 to the power steering gear 18 is to the order of 30 to 50 psi when no steering correction is being made and this same pressure is made available to the power supply chamber 50. Also, it will be noted that the area of the piston 164 which is affected by pressure to produce a force to the right is less than the effective area producing a force to the left. This differential in pressure area, and consequently, in the opposing forces is of importance in insuring that there is a greater pressure being supplied to the inlet 15 than is being utilized in the power chamber 112 to produce braking. For example, initially with the pressure of the supply fluid from the power steering pump 12 to the order of 50 psi, the pressure in the supply chamber 50 will also be 50 psi and the pressure in the power chamber 112 to the right of the power piston will be equal to return pressure of approximately 5 psi. Under these conditions, the piston 164 of the demand valve 160 is urged to the right as shown in FIG. 2. However, when the inlet valve 74, 76 is opened to supply fluid from the chamber 50 to the power chamber 112 for the purpose of producing braking, the pressure in the chamber 112 is increased from approximately 5 psi toward the pressure level available in the supply chamber 50. This pressure is made available in the cavity 168 at the right of the piston 164 and, since this pressure acts on a larger effective area to the left on the piston 164, the latter is moved to the left to obstruct the passage of fluid from the power steering pump and to increase that pressure. In the preferred embodiment, the differential areas are so selected that a pressure of 25 psi in the power chamber 112 is sufficient to balance a pressure of 50 psi from the power steering pump 12. As a result, the pressure available in the supply chamber 50 for utilization in braking is maintained at a level of approximately 25 psi more than the pressure which is being utilized in the power chamber 112 to produce braking.

It should be understood that when steering corrections are being made, the power steering pump 12 delivers higher pressures to the power steering gear 18 because of the demands of the latter. Assuming that a steering correction is being made which results in a pressure at the inlet 15 to the order of 200 psi, the same pressure is made available through the pressure regulating valve 120 to the supply chamber 50 and to the inlet valve. If, at the same time, the inlet valve 74, 76 is to be opened to produce braking, the demand valve piston 164 will be maintained in the position shown in FIG. 2 until 175 psi of that pressure has been utilized in the power chamber 112. Thereafter, if more pressure is required, the increase in pressure will be transmitted to the chamber 168 and will act to move the piston 164 to the left to further increase the pressure being supplied by the power steering pump 12 to the inlet 15 and consequently, to the power supply chamber 50. In this manner, the demands of the hydraulic booster unit 10 on the power steering pump 12 are kept at a minimum, that is, the booster unit uses the pressure available in the power steering system until such time as more pressure is required for braking and only then is a demand made which increases the pressure level to only 25 psi more than would ordinarily be supplied. This reduces the demands on the power steering pump and also reduces the various initial pressure loads which are placed on the seals of the booster brake mechanism and keeps frictional and hysteresis forces at a minimum for easy operation of the hydraulic power brake mechanism 10.

To insure continued movement of the piston assembly 42, by increase in pressure in the power chamber 112, the control member 54 must also be moved to maintain the exhaust valve 80, 82 closed and the inlet valve 74, 76 open. It is for this reason that the valve arrangement is referred to as the follow-up valve, that is, the movement of the valve must follow the power piston assembly 42 in order to maintain the exhaust valve closed and the inlet valve open to continue increasing the pressure in the power chamber 112.

Upon an increase in pressure in the power chamber 112 to the right of the power piston 94, the same pressure is available in the cavity 190 which, under most conditions, is isolated from the remainder of the fluid in the power steering, power brake circuit. Although isolated, the cavity 190 will contain fluid at the same pressure as the pressure in the control or power chamber 112 to the right of the power piston 94 because the pistons 94 and 96 are independent of each other and pressure acting on piston 94 is transmitted by the latter to the fluid trapped in the cavity 190. With the cavity 190 isolated, leftward movement of the power piston 94 is transmitted to the smaller output piston 96 by way of the hydraulic fluid in the cavity 190. The diameter of the power piston 94 is greater than the diameter of the output piston 96 and, as the power piston 94 moves to the left, a constant volume of fluid is maintained in the cavity 190 so that for every increment of movement of the power piston 94 to the left, there is a larger increment of movement of the output piston 96. The net result is that the movement of the output member 46 is greater than the movement of the control member 54 making only a small amount of pedal travel necessary to achieve power braking.

After the power piston assembly 42 begins movement to the left in a brake applying direction and after the desired degree of braking has been achieved, the addition of force to the pedal 24 is discontinued but maintained. As a result, the power piston 94 will move to the left an increment to permit closing of the inlet valve 74, 76 while maintaining the exhaust valve 80, 82 closed. This is the lap condition of the power brake unit in which the brake will be held at a selected degree of actuation. Additional braking may be achieved by adding a greater force to the brake pedal 24 to move the control member 54 to the left or the brake may be released by relieving manual effort from the pedal brake 24 to permit the control member to move to the right.

The force which must be applied by the operator on the pedal 24 to move the control member 54 is determined by the pressure existing in the power chamber 112 formed to the right of the power piston 94 which acts on an area defined by the engagement of the seal 56 with the control member 54 less the area determined by the annular line of contact of the valve element 74 with the valve seat 76. This pressure results in a force to the right on the control member 54 which remains in a direct proportion to the larger force acting to the left on the large diameter of the power piston 94 and is the reaction of "feel" which is sensed by the operator during actuation of the brakes. It is apparent that the degree of "feel" can be selected as desired by selecting appropriate dimensions for diameters in a manner well known in the art. It will be noted that the pressure in the cavity 60 acts equally in opposite directions on seals 56 and 58 and the pressure in chamber 86 acts equally in opposite directions on the valve rod 70 and does not affect the reaction or feel.

After the desired degree of braking is achieved, releasing the brakes is accomplished by relieving the force on the pedal 24 which allows the control member 54 to move to the right under the urging of spring 110. Initially, the inlet valve 74, 76 closes and subsequently the exhaust valve 80 separates from the valve seat 82 and opens the passage 106 permitting pressure in the power chamber 112 to escape to the return chamber 109 and through the return line 22 back to the reservoir of the power steering pump 12. As the pressure in the power chamber 112 decreases, the pressure in the cavity 190 between the pistons 94 and 96 also decreases and as the power piston assembly 42 moves to the right, the output piston is also moved to the right under the urging of a return spring 246. Such movement maintains a constant volume of fluid in chamber 190 and permits the pistons to move toward each other. In other words, movement of the power piston 94 to the right makes more of the larger bore 90 available for fluid and the output piston 96 returns a greater distance than the power piston 94 to maintain the fluid isolated in chamber 190 at a constant volume.

Upon release of the brakes and a reduction in pressure in the power chamber 112, an identical reduction occurs in the bore 168 at the right end of the demand valve piston 162 permitting the piston to move to the right to the position shown in the drawings to reduce the pressure at the inlet 15 to the pressure level required by the power steering system.

The booster brake mechanism is capable of operation by physical effort of the operator to achieve braking under conditions when the source of pressurized hydraulic fluid fails. In the absence of pressure in the supply chamber 50, movement of the input member 26 to the left will close the exhaust valve 80, 82 and will open the inlet valve 74, 76 but the piston assembly 42 will remain stationary. As a result, a cup-shaped member 69 at the left end of the control member 54 will compress the spring 110 and move into engagement with the power piston 94. Thereafter, any additional leftward movement caused by the application of physical force to the brake pedal 24 will be transmitted directly to the power piston 94 causing it to move to the left. The power piston 94 will remain in engagement with the output piston 96 as the piston assembly 42 moves to the left and hydraulic fluid in the cavity 190 will increase in pressure due to the decreasing volume of the cavity and will be forced through the passage 198 and through the valve 192 through the passages 176 and 178 to the power chamber 112. This permits the power piston 94 and output piston 96 to remain in engagement with each other so that leftward movement is transmitted to the output rod 46 for manually applying the brakes.

Manual operation of the booster brake mechanism also is accomplished when the maximum pressure which is available at the supply chamber 50 has been utilized. This condition exists when the full capacity of the power steering pump 12 has been utilized or when the pressure regulating valve 120 has closed so that no further increase in pressure is available to the supply chamber 50. Under such conditions, physical effort of the operator applied to the input member 26 is transmitted as in the case when no pressure is available in the supply chamber 50 directly to the piston assembly 42 for adding the physical force to the force of the pressure already acting on the piston assembly for application of the brakes.

It will be noted that when the maximum pressure, as determined by the pressure regulating valve 120, has been utilized, for example, 800 psi, additional braking can be obtained by adding physical force to the input member 26 as previously described. Under such condition, the pressure in the power chamber 112 is relieved by the amount of physical force that is applied to the input member 26 and this reduction in pressure also occurs in the chamber 168 of the demand valve 160. Consequently, if the power steering system requires pressures in excess of 800 psi for steering corrections, the piston 64 of the pressure demand valve 160 will be moved to the right to enlarge the passage between the cavities 184 and 186 to permit the free flow of fluid from the power steering pump to the inlet 15 to the outlet 16 and to the power steering gear 18.

It will now be seen that there has been provided a hydraulic booster brake mechanism which will operate in existing hydraulic systems on vehicles such as the power steering ststem without requiring modification of the system. The hydraulic booster operates independently and is not affected by steering manipulations. Moreover, the booster brake mechanism does not impose maximum loads on the power steering pump but only such loads as are required to actuate the brakes, in many instances the pressure being circulated by the power steering pump to the power steering gear being sufficient to achieve braking. Additionally, by making available only the pressure required to operate the brake booster, the need for a supply of a relatively high, constant pressure is eliminated thereby minimizing loads due to differential pressures acting on various seals and moving parts.

What is claimed is:

1. In a hydraulic booster brake mechanism for energizing a master cylinder which supplies pressure to the wheel cylinders of a vehicle comprising; a housing including an inlet, an outlet and a supply chamber in communication with said inlet, piston means shiftable in said housing and forming a control chamber at one side thereof, control valve means for admitting fluid pressure from said supply chamber to said control chamber for shifting said piston in said housing, demand valve means shiftable between a first position in which substantially all fluid flowing into said inlet is directed to said outlet and the pressure level is low and a second position in which fluid flow is restricted and the pressure level at said inlet is high with the pressure level becoming successively higher as said valve means is shiftable from said first position toward said second position, said demand valve means being shiftable toward said second position in response to a pressure in said control chamber greater than at said inlet whereby the pressure in said supply chamber is increased.

2. The booster brake mechanism set forth in claim 1 in which said demand valve means is responsive to pressure at said inlet greater than pressure in said control chamber to maintain said demand valve in said first position.

3. The booster brake mechanism set forth in claim 2 and further comprising spring means biasing said demand valve means toward said second position in the absence of pressure in said inlet.

4. The booster brake mechanism set forth in claim 1 in which said demand valve means includes a bore in said housing, a piston in said bore forming first and second chambers at opposite sides thereof, said first chamber communicating with said inlet and said supply chamber and said second chamber communicating with said control chamber.

5. The booster brake mechanism set forth in claim 1 in which said demand valve has a first pressure responsive area exposed to the pressure at said inlet and a second pressure responsive area exposed to the pressure in said control chamber and opposing said first pressure responsive area, said second pressure responsive area being larger than said first pressure responsive area whereby said demand valve is urged toward said second position to maintain a pressure in said supply chamber greater than the pressure in said power chamber.

6. In an hydraulic booster mechanism for use in a system having a source of continuously circulating fluid pressure, a housing having an inlet connected to said source, said housing defining a bore, a piston slidable in said bore and forming a power chamber therein at one side of said piston, a fluid supply chamber in said housing communicating with said inlet, control valve means operatively disposed between said fluid supply chamber and said power chamber and being selectively operable for admitting said circulating fluid pressure from said supply chamber to said power chamber for moving said power piston towards one end of said bore, and demand valve means operatively disposed between said inlet and said supply chamber and being movable between a first position in which said inlet is open and pressure level is low and a second position in which said inlet is restricted and the pressure level is higher, said demand valve means being urged toward said first position in response to pressure from said inlet and toward said second position in response to pressure in said power chamber whereby the pressure differential in said power chamber and at said inlet determine the degree of restriction at said inlet.

7. The hydraulic booster brake mechanism set forth in claim 6 in which said demand valve means includes piston means having opposite sides exposed to pressure at said inlet and in said power chamber, respectively, said piston side exposed to said inlet being less responsive to pressure than said piston side exposed to said power chamber whereby the pressure at said inlet is maintained higher than the pressure in said power chamber.

8. The hydraulic booster brake mechanism set forth in claim 6 and further comprising pressure regulating means operatively disposed between said demand valve means and said supply chamber and being operative to isolate said supply chamber when the pressure in the latter is at a predetermined maximum.

9. In a hydraulic booster brake mechanism for use with a continuously circulating source of fluid pressure, a housing having an inlet and an outlet, passage means in said housing communicating said inlet with said outlet, demand valve means operatively associated with said passage means and being movable between a first position in which said passage means is open and the pressure level at said inlet is low and a second position in which said passage means is restricted and the pressure level at said inlet is high, a power piston movable in said housing and forming a power chamber at one side thereof, a fluid supply chamber in said housing and communicating with said passage means between said inlet and said demand valve means, control valve means operatively disposed between said supply chamber and said power chamber and being selectively operable to admit fluid to said power chamber for moving said power piston, and means for moving said demand valve means from said first position toward said second position in response to pressure in said power chamber.

10. The booster brake mechanism set forth in claim 9 in which said means for moving said demand valve means includes piston means forming a first pressure responsive surface at one side communicating with said supply chamber and a second pressure responsive surface at the other side communicating with said power chamber, said first pressure responsive surface being smaller than said second pressure responsive surface whereby the pressure in said supply chamber is maintained at a higher pressure than in said power chamber.

* * * * *